ary Patent Office 3,839,497
Patented Oct. 1, 1974

3,839,497
POLYACETAL COMPOSITION
Takami Ishii and Toshio Yoshikawa, Chiba, Toshihiro Inaike and Kunio Kido, Ichihara, Kiyoaki Tokunaga, Ube, and Kazuhiro Kuroda, Kyoto, Japan, assignors to Ube Industries, Ltd., Ube-shi, Yamaguchi-ken, Japan
No Drawing. Filed Mar. 14, 1972, Ser. No. 234,650
Claims priority, application Japan, Mar. 23, 1971, 46/16,148
Int. Cl. C08g 41/04
U.S. Cl. 260—857 F
7 Claims

ABSTRACT OF THE DISCLOSURE

A polyacetal composition having a high thermal stability at high temperature contains a polyamide which is a polycondensation product from at least one component (A) of the formula: $H_2NRNH_2$, at least one component (B) of the formula: $XOCCH_2COX$ and at least one component (C) of the formula: $YCH_2COX$, wherein R is a group selected from the class consisting of aliphatic, alicyclic and aromatic hydrocarbon groups having 2 to 20 carbon atoms and groups consisting of two or more of the above-mentioned hydrocarbon groups combined by oxygen or sulphur atom, X is a member selected from the class consisting of hydroxyl group, halogen atoms and lower alkoxyl groups having 1 to 6 carbon atoms, and Y is a member selected from the class consisting of cyano and carbamoyl groups, preferably, in an amount of 0.01 to 10% by weight.

The present invention relates to a polyacetal composition having a high heat stability, more particularly, relates to a polyacetal composition containing a specific polyamide and having high resistance against thermal decomposition and discoloration at high temperature.

The term "polyacetal" used herein refers to a polymeric compound consisting essentially of polymerized oxymethylene units, particularly, comprising at least 90% by weight of polymerized oxymethylene units.

The polyacetal useable for the present invention may be selected from homopolymers of an oxymethylene compound selected from the class consisting of formaldehyde, trioxane and tetraoxane, and copolymers of at least one member selected from the above-mentioned oxymethylene compounds and at least one monomer capable of copolymerizing with the above-mentioned oxymethylene compounds, for example, ketene, cyclic ethers, alkylene oxide and carbon monoxide. In the case where the above-stated homopolymers and copolymers have unstable or active terminal groups, the terminal groups may be modified by a stable or non-active group. Such modified, that is, stabilized polyacetals may be used in the art of the present invention.

The polyacetals are useful for producing various shaped articles. However it is well-known that the simple polyacetal is unstable at high temperature and thus tends to thermally decompose. Generally, in order to enhance the resistance against thermal decomposition, a so-called stabilizing compound is admixed into the polyacetal. It is known that polyamides having a high molecular weight, polyurethanes, amide compounds and urea are effective for stabilizing the polyacetal. However, the polyacetal compositions containing the conventional stabilizers have a low resistance against thermal decomposition and discoloration when the polyacetal composition is heated to a high temperature.

Also, in the case where the conventional polyamides are admixed into the polyacetal as a stabilizer, it seems that the lower the molecular weight of the conventional polyamides, the lower the stabilizing effect thereof.

An object of the present invention is to provide a polyacetal composition having a high resistance against thermal decomposition at high temperature.

Another object of the present invention is to provide a polyacetal composition having a high resistance against thermal discoloration at high temperature.

A further object of the present invention is to provide a polyacetal composition containing a specified polyamide effective for preventing the polyacetal from thermal decomposition and discoloration at high temperature.

The objects of the present invention are accomplished by the polyacetal composition as stated below which have been discovered by the inventor's study of stabilizers effective for the polyacetal.

The polyacetal composition of the present invention comprises a polyacetal and polyamide and is characterized in that the polyamide is a polycondensation product of at least one component (A) of the formula:

$$H_2NRNH_2$$

wherein R is a group selected from the class consisting of aliphatic, alicyclic and aromatic hydrocarbon groups having 2 to 20 carbon atoms and groups consisting of two or more of the above-stated hydrocarbons combined by an oxygen or sulphur atom; at least one component (B) of the formula:

$$XOCCH_2COX$$

wherein X is a group selected from the class consisting of hydroxyl group, halogen atoms and lower alkoxy groups having 1 to 6 carbon atoms; and at least one component (C) of the formula:

$$YCH_2COX$$

wherein X is the same as stated above and Y is a group selected from the class consisting of cyano and carbamoyl groups.

The component (A) of the formula $H_2NRNH_2$ of the polyamide usable for the present invention may be selected from ethylene diamine, 1,2-diaminopropane, 1,3-diaminopropane, 1,2-diaminobutane, 1,4-diaminobutane, 2,3-diaminobutane, 1,2-diamino-2-methylpropane, 1,5-diaminopentane, 1,6-diaminohexane, 1,7-diaminoheptane, 1,8-diaminooctane, 1,10-diaminodecane, 1,12-diaminododecane, 1,18-diaminooctadecane, 1,20-diaminoeicosane, bis($\beta$-aminoethyl) ether, bis($\gamma$-aminopropyl) ether, 1,2-bis($\gamma$-aminopropoxy) ethane, p-phenylenediamine, m-phenylenediamine, p-aminobenzylamine, m-aminobenzylamine, p-xylylendiamine, m-xylylendiamine, 1,4-diaminocyclohexane, 1,3 - diaminocyclohexane, 1,4 - bis(aminomethyl)cyclohexane, 1,3 - bis(aminomethyl)cyclohexane, 4,4' - diaminobiphenyl, 4,4' - diaminodiphenylmethane, 4,4'-diaminodiphenylether and 4,4'-diaminodiphenylthioether.

The component (B) of the formula : $XOCCH_2COX$ of the polyamide usable for the present invention may be selected from malonic acid, diethyl malonate, dimethyl malonate and malonic acid dichloride.

The component (C) of the formula: YCH$_2$COX of the polyamide usable for the present invention may be selected from cyanoacetic acid, methyl cyanoacetate, ethyl cyanoacetate, cyanoacetic acid chloride, malonic acid monoamide, monomethyl ester of malonic acid monoamide and malonic acid monoamide monochloride.

The polyamide usable for the present invention is prepared from the above-mentioned, components (A), (B) and (C) by polycondensing them in the conventional way in the presence or absence of solvent for the components. The ratio between the components in the polyamide is not limited, but it is preferable that each of the components (A) and (B) is in amounts of 1 to 30 mole with rsepect to 1 mole of the component (C). The polymerization of the mixture of the components is carried out at a temperature from room temperature to 200° C. for 30 minutes to several days. There is no limitation on the molecular weight of the polyamide usable for the present invention, but it is preferable that the polyamide has a molecular weight of 300 to 100,000, more preferably, 450 to 5,000. Since the component (C) is a monofunctional compound, the molecular weight of the polyamide can be controlled by adjusting the amount of the component (C) with respect to the amounts of the components (A) and (B). That is, the greater the amount of the component (C), the lower the molecular weight of the resultant polyamide. Also, there is no limitation on the melting point of the polyamide usable for the present invention, but it is preferable that the melting point of the polyamide is near that of the polyacetal to be admixed with the polyamide or the shaping temperature of the polyacetal composition. Generally, a polyamide having a melting point of 100 to 230° C. is useful for the present invention. The melting point of the polyamide can be controlled by selecting the components to be subjected to the polycondensation and adjusting the amounts of the components. Also, the melting point of the polyamide can be controlled by subjecting two or more kinds of the first components, that is, diamino compounds, to polycondensation, and by adjusting the mixing ratio of the first components.

There is no limitation on the amount of the polyamide to be mixed into the polyacetal, but it is preferable that the polyamide is admixed in an amount of 0.01 to 10% based on the weight of the polyacetal.

The polyacetal composition according to the present invention may contain one or more conventional antioxidants together with the polyamide. This is effective for further enhancing the stability of the polyacetal composition at high temperature. The antioxidant usable for the polyacetal composition of the present invention can be selected from the conventional antioxidants, for example, 2,2'-methylene-bis(4-methyl-6-tert-butylphenol),
2,2'-ethylidenebis(4-methyl-6-tert-butylphenol),
2,2'-butylidenebis(4-methyl-6-tert-butylphenol),
2,2'-methylenebis(4,6-di-tert-butylphenol),
2,2'-methylenebis(4-ethyl-6-tert-butylphenol),
4,4'-methylenebis(2,6-di-tert-butylphenol),
4,4'-butylidenebis(3-methyl-6-tert-butylphenol),
4,4'-isopropylidenebis(2-methyl-6-tert-butylphenol),
4,4'-thiobis(3-methyl-6-tert-butylphenol),
2,2'-thiobis(4-methyl-6-tert-butylphenol),
tetrakis[methylene-3-(3,5-di-tert-butyl-4-hydroxy phenyl)propyonate]methane,
1,3,5-trimethyl-2,4,6-tris(3,5-di-tert-butyl-4-hydroxybenzyl)benzene,
1,1,3-tris(2-methyl-4-hydroxy-5-tert-butylphenyl)butane,
2,4-bis(4-hydroxy-3,5-di-tert-butylphenoxy)-6-(n-octylthio)-1,3,5-triazine and
N,N'-di-β-naphthyl-p-phenylenediamine.

There is no limitation on the amount of the antioxidant to be admixed into the polyacetal composition, but generally, it is preferable that the amount of the antioxidant in the polyacetal composition is 0.01 to 2.0% based on the weight of the polyacetal.

In order to prepare the polyacetal composition according to the present invention, for example, finely divided polyamide is uniformly admixed with the finely divided polyacetal by using a mixer. Also, a solution of the polyamide in an organic solvent such as methanol, ethanol or acetone is uniformly mixed with the finely divided polyacetal and the solvent is evaporated from the mixture by heating it. The resultant mixture is melted and shaped into the desired article.

The polyacetal composition of the present invention has a definite advantage that the composition shows higher resistance against decomposition and discoloration at high temperature than those of the polyacetal composition containing the conventional stabilizer or antioxidant only. That is, the polyamide usable for the present invention is definitely distinguished from the conventional polyamide in the point that the stabilizing effect of the polyamide usable for the present invention does not substantially depend on the molecular weight thereof whereas in the case of the conventional polyamide, the lower the molecular weight, the lower the stabilizing effect on the polyacetal. That is, even if the polyamide usable for the present invention has a relatively low molecular weight, the polyamide has a stabilizing effect on the decomposition and discoloration of the polyacetal similar to that of the polyamide of high molecular weight.

Various polyacetal compositions of the present invention are illustrated by the following examples. These examples are intended merely to illustrate the invention and not in any sense to limit the scope of the present invention.

In the Examples, the intrinsic viscosity of the polyacetal was determined by the method wherein the polyacetal is dissolved into p-chlorophenol containing 2% by weight of α-piene in a concentration of 0.4%, and the solution is subjected to measurement of the viscosity at a temperature of 60° C. using a Cannon-Fenske Viscometer. The resistance of the polyamide against the thermal decomposition at high temperature is expressed by the coefficient of thermal decomposition rate at a temperature of 222° C. This coefficient was determined by the method in which 1.0 g. of powder or chips of the polyacetal or its composition to be measured is charged into a test tube having an inside diameter of 12 mm., the tube is immersed into an oil bath of 222° C. for 30 minutes, and the weight of the heat-treated material is determined. The coefficient of thermal decomposition rate A$_{222}$ (percent/min.) is calculated from the equation:

$$A_{222} = \frac{\text{(Weight of the original material)} - \text{(Weight of the heat-treated material)}}{\text{Weight of the original material} \times 30} \times 100$$

This is, the coefficient of thermal decomposition rate means a rate in percent of the decrease in the weight of the material per minute.

EXAMPLES 1 TO 20

Ten kinds of polyamides (1A to 1J) shown in Table 1 were prepared by polycondensing mixtures of m-xylenediamine, diethyl malonate and malonic acid monoamide monoethylester in the compositions as shown in Table 1 in a closed reactor with stirring. The polycondensations were carried out at temperatures and times as shown in Table 1. In these procedures, the polyamides 1A to 1D were polycondensed in an atmosphere of air and the polyamides 1E to 1J were produced in an atmosphere of nitrogen. The polycondensation products were washed with cold methanol and then dried under a reduced pressure. The resultant polyamides 1A to 1J had the melting points and molecular weights as shown in Table 1.

TABLE 1

| | Composition (part by weight) | | | Polycondensation | Polyamide | |
|---|---|---|---|---|---|---|
| | m-Xylyl-enediamine | Diethyl malonate | Malonic acid monoamide monoethyl-ester | Temperature (° C.) | Melting point (° C.) | Molecular weight |
| Polyamide: | | | | | | |
| 1A | 1.04 | 0.62 | 1.00 | Room temperature  3 days | 162~168 | 470 |
| 1B | 2.08 | 1.85 | 1.00 | do  do | 143~148 | 810 |
| 1C | 3.65 | 3.69 | 1.00 | do  do | 137~142 | 1,230 |
| 1D | 5.00 | 6.15 | 1.00 | do  do | 137~143 | 1,840 |
| 1E | 12.00 | 12.30 | 1.00 | do  do | 130~140 | 3,250 |
| 1F | 1.04 | 0.62 | 1.00 | 150  5 hours | 160~170 | 490 |
| 1G | 2.08 | 1.85 | 1.00 | 150  1 hour | 160~165 | 860 |
| 1H | 3.65 | 3.69 | 1.00 | 150  do | 153~160 | 1,410 |
| 1I | 5.00 | 6.15 | 1.00 | 150  do | 143~150 | 2,110 |
| 1J | 12.00 | 12.30 | 1.00 | 150  5 hours | 140~153 | 3,970 |

In order to prepare the compositions of Examples 1 to 10, the polyamides 1A to 1J were admixed with polyoxymethylene diacetate by the following method. That is, 5.0 g. of finely divided polyoxymethylene diacetate having an intrinsic viscosity of 1.45 and a coefficient of thermal decomposition rate at 222° C. of 0.355 were immersed in 20 ml. of a methanol solution containing 1.0% of one member of the polyamides 1A to 1J based on the weight of the polyoxymethylene diacetate and the mixture was stirred so as to sufficiently penetrate the methanol solution into the polyoxymethylene diacetate. Then, the mixtures were dried at 60° C. under vacuum so as to evaporate methanol from the mixture. The dried compositions were formed into pellets of 10 mm. diameter and 10 mm. thickness. The pellets were subjected to measurement of coefficient of thermal decomposition rate at a temperature of 222° C.

In order to prepare the compositions of Examples 11 to 20, the same procedure as stated above was repeated ten times using methanol solutions containing 1.0% of one member of the polyamides 1A to 1J and 0.2% of 2,2′-methylenebis(4-methyl-6-tert-butylphenol) based on the weight of the polyoxymethylene diacetate. The resultant pellets were also subjected to measurement of coefficient of thermal decomposition rate at 222° C.

For comparison, compositions of Comparison Examples 1 to 4 and 5 to 8 were prepared by the same procedures as that of Examples 1 to 10 and 11 to 20 except that the methanol solutions contained 1.0% based on the weight of the polyoxymethylene of one selected from cyanoacetic acid amide (Comparison Examples 1 and 5), malonic acid diamide (Comparison Examples 2 and 6), polycaprolactam (Comparison Examples 3 and 7) having a mean molecular weight of 750 and a 6,66,610 terpolyamide (Comparison Examples 4 and 8) consisting of 36 parts by weight of caprolactam units, 36 parts by weight of hexamethylene adipate units and 28 parts by weight of hexamethylene sebacamide units and having a mean molecular weight of 1030, instead of the polyamides 1A to 1J.

The compositions of Comparison Examples 1 to 8 were subjected to measurement of coefficient of thermal decomposition rate at 222° C.

The results of the measurements are shown in Table 2.

TABLE 2

| Example | | Coefficient of thermal decomposition rate | Example | Coefficient of thermal decomposition rate |
|---|---|---|---|---|
| Polyamide: | | | | |
| 1A | 1 | 0.040 | 11 | 0.016 |
| 1B | 2 | 0.038 | 12 | 0.014 |
| 1C | 3 | 0.039 | 13 | 0.013 |
| 1D | 4 | 0.037 | 14 | 0.012 |
| 1E | 5 | 0.038 | 15 | 0.012 |
| 1F | 6 | 0.043 | 16 | 0.015 |
| 1G | 7 | 0.047 | 17 | 0.016 |
| 1H | 8 | 0.049 | 18 | 0.015 |
| 1I | 9 | 0.048 | 19 | 0.016 |
| 1J | 10 | 0.049 | 20 | 0.015 |
| Cyanoacetic acid amide | Comparison Example 1 | 0.093 | Comparison Example 5 | 0.065 |
| Malonic acid diamide | Comparison Example 2 | 0.105 | Comparison Example 6 | 0.070 |
| Poly caprolactam | Comparison Example 3 | 0.111 | Comparison Example 7 | 0.088 |
| 6,66,610 terpolyamide | Comparison Example 4 | 0.091 | Comparison Example 8 | 0.060 |
| None | Control 1 | 0.355 | Control 2 | 0.215 |

NOTE:
Control 1 = Simple polyoxymethylene diacetate.
Control 2 = Polyoxymethylene composition containing 0.2% of 2,2′-methylenebis(4-methyl-6-tert-butylphenol) only.

In Table 2 it is seen that the less the coefficient of thermal decomposition rate, the higher the heat stability. From Tables 1 and 2, it is evident that the compositions of Examples 1 to 10 which contain only the polyamides as stabilizer in accordance with the present invention have a heat-stability much higher than that of the simple polyoxymethylene diacetate (Control 1) and the compositions of Comparison Examples 1 to 4 each containing the conventional stabilizer. Also, the compositions of Examples 11 to 20 containing as stabilizer the polyamide and the conventional antioxidant in accordance with the present invention, had a heat stability higher than that of Examples 1 to 10, Control 2 and Comparison Examples 5 to 8.

Moreover, it is obvious that the effect of the polyamides 1A to 1J on the coefficient of thermal decomposition rate at 222° C. does not depend on the molecular weight thereof. That is, even if they have a relatively low molecular weight, the polyamides according to the present invention show a superior effect on the heat stability of the polyoxymethylene.

EXAMPLES 21 TO 56

Eighteen kinds of polyamides 2A to 2R were prepared by polycondensing mixtures of malonic acid diethyl ester, an ester selected from cyanoacetic acid ethyl ester and malonic acid monoamide monoethyl ester and one member selected from the diamino compounds shown in Table 3 in an amount shown in Table 3 in a closed reactor with stirring. The temperatures and times of the polycondensations are also shown in Table 3. In the procedures, the polycondensations of the polyamides 2G, 2H, 2O and 2P were carried out in an atmosphere of nitrogen and other polycondensations were effected in air.

of Examples 21 to 38 according to the present invention which contain only the polyamides as stabilizer have a

TABLE 3

| | Composition (part by weight) | | | | | |
|---|---|---|---|---|---|---|
| | Component (A) | Component (B) | Compound (C) | | Polycondensation | |
| | Diamino compound | Malonic acid diethylester | Cyanoacetic acid ethylester | Malonic acid monoamide monoethylester | Temperature (° C.) | Time |
| Polyamide: | | | | | | |
| 2A | Ethylenediamine 0.78 | 1.39 | 1.00 | | Room temperature | 1 day. |
| 2B | 1,6-diaminohexane 1.52 | 1.39 | 1.00 | | do | Do. |
| 2C | 1,12-diaminododecane 6.09 | 4.17 | 1.00 | | do | Do. |
| 2D | Bis(γ-aminopropyl)-ether 4.00 | 4.17 | 1.00 | | do | Do. |
| 2E | 1,3-diaminocyclohexane 1.48 | 1.39 | 1.00 | | do | Do. |
| 2F | m-Xylylenediamine 4.13 | 4.17 | 1.00 | | do | Do. |
| 2G | p,p'-diaminodiphenylmethane 2.56 | 1.39 | 1.00 | | 150 | 5 hours. |
| 2H | p,p'-diaminodiphenylether 2.61 | 1.39 | 1.00 | | 150 | Do. |
| 2I | Ethylenediamine 0.78 | 1.39 | | 1.00 | Room temperature | 1 day. |
| 2J | 1,12-diaminohexane 1.52 | 1.39 | | 1.00 | do | Do. |
| 2K | 1,12-diaminododecane 6.09 | 4.17 | | 1.00 | do | Do. |
| 2L | Bis(γ-aminopropyl)-ether 4.00 | 4.17 | | 1.00 | do | Do. |
| 2M | 1,3-diaminocyclohexane 1.48 | 1.39 | | 1.00 | do | Do. |
| 2N | m-Xylylenediamine 4.13 | 4.17 | | 1.00 | do | Do. |
| 2O | p,p'-diaminodiphenyl methane 2.56 | 1.39 | | 1.00 | 150 | 5 hours. |
| 2P | p,p'-diaminodiphenylether 2.61 | 1.39 | | 1.00 | 150 | Do. |
| 2Q | {1,6-diaminohexane 1.52 / m-Xylylenediamino 1.78} | 3.48 | | 1.00 | Room temperature | 1 day. |
| 2R | {Ethylenediamine 0.78 / Bis(γ-aminopropyl)-ether 1.74} | 3.48 | 1.00 | | do | Do. |

In order to prepare the compositions of Examples 21 to 38, the polyamides 2A to 2R were mixed with 5.0 g. of powdered polyoxymethylene diacetate having an intrinsic viscosity of 1.50 and a coefficient of thermal decomposition rate at 222° C. of 0.350, in an amount of 1.0% based on the weight of the polyoxymethylene diacetate by the same method as that of Examples 1 to 10. The compositions of Examples 21 to 38 were formed into pellets in the same way as Examples 1 to 10. The same procedures as stated above were repeated eighteen times further adding 0.2% of 2,2'-methylenebis(4-methyl-6-tert-butylphenol) based on the weight of the polyoxymethylene diacetate to the compositions of Examples 21 to 38 in order to prepare the compositions of Examples 39 to 56.

The compositions of Examples 21 to 56 had a coefficient of thermal decomposition rate at 222° C. as shown in Table 4.

TABLE 4

| Polyamide | Example | Coefficient of thermal decomposition rate | Example | Coefficient of thermal decomposition rate |
|---|---|---|---|---|
| 2A | 21 | 0.055 | 39 | 0.019 |
| 2B | 22 | 0.042 | 40 | 0.014 |
| 2C | 23 | 0.041 | 41 | 0.013 |
| 2D | 24 | 0.040 | 42 | 0.013 |
| 2E | 25 | 0.048 | 43 | 0.018 |
| 2F | 26 | 0.036 | 44 | 0.011 |
| 2G | 27 | 0.054 | 45 | 0.025 |
| 2H | 28 | 0.053 | 46 | 0.019 |
| 2I | 29 | 0.061 | 47 | 0.023 |
| 2J | 30 | 0.045 | 48 | 0.015 |
| 2K | 31 | 0.043 | 49 | 0.014 |
| 2L | 32 | 0.041 | 50 | 0.013 |
| 2M | 33 | 0.050 | 51 | 0.020 |
| 2N | 34 | 0.038 | 52 | 0.012 |
| 2O | 35 | 0.057 | 53 | 0.021 |
| 2P | 36 | 0.054 | 54 | 0.019 |
| 2Q | 37 | 0.033 | 55 | 0.010 |
| 2R | 38 | 0.037 | 56 | 0.101 |
| None | Control 3 | 0.350 | Control 4 | 0.208 |

NOTE:
Control 3 = Simple polyoxymethylene diacetate.
Control 4 = Polyoxymethylene diacetate composition containing 0.2% by weight of 2,2'-methylenebis(4-methyl-6-tert-butylphenol) only.

From Tables 3 and 4, it is evident that the compositions heat stability much greater than that of the simple polymethylene diacetate. Also, it is obvious that the compositions of Examples 39 to 56 which contain the polyamides together with the conventional antioxidant, have a heat stability higher than that of Examples 21 to 38 owing to the presence of the antioxidant. Further, it is evident that the polyamides 2A to 2R are more effective for enhancing the heat stability of the polyoxymethylene diacetate than that of the conventional antioxidant, 2,2'-methylenebis(4-methyl-6-tert-butylphenol).

EXAMPLES 57 TO 92

The polyamides 2A to 2R shown in Table 3 were added having an intrinsic viscosity of 1.55 and coefficient of thermal decomposition rate at 222° C. for 0.338 in an amount of 1.0% based on the weight of the polyoxymethylene diacetate in order to prepare the compositions of Examples 57 to 74. Also, in order to prepare the compositions of Examples 75 to 92, the polyamides 2A to 2R were admixed into the same polyoxymethylene diacetate in the same amounts as those above together with 0.2% of 2,2'-butylidenebis(4-methyl-6-tert-butylphenol) based on the weight of the polyoxymethylene diacetate.

For Comparison Examples 9 to 12 and 13 to 16, the same procedures as Examples 57 to 74 and 75 to 92 were repeated using the same cyanoacetic acid amide, malonic acid diamide, polycaprolactam and 6,66,610 ter-polyamide as those used in Comparison Examples 1 to 8, instead of the polyamides 2A to 2R.

A portion of each of the compositions of Examples 57 to 92 and Comparison Examples 9 to 16 was melted to 190° C. in an extruder and extruded and cut to form chips of 2 mm. diameter and 4 mm. length. Also the remaining portion of each of the compositions of Examples 57 to 92 and Comparison Examples 9 to 16 was formed into discs of 30 mm. diameter and 3 mm. thickness by heat pressing for 5 minutes using to heat presser.

The chips thus prepared were subjected to measurement of the coefficent of thermal decomposition rate at 222° C. in the same way as that of Examples 1 to 20 and the discs were subjected to the measurement of whiteness using a Hunter color and gloss meter made by Nippon Denshoku Kogyo Co., Ltd., Japan, type CS–K5.

The whiteness was determined in accordance with the following equation:

Hunger Whiteness $= 100 - [(100-L)^2 + (a^2+b^2)]^{1/2}$ wherein $L = 100\sqrt{Y}$, $a = 175(1.02\ X - Y)/\sqrt{Y}$ and $b = 70(Y - 0.847u)\sqrt{Y}$ wherein X, Y and Z are tristimulus values in CIE system.

The results of the measurements of the coefficient of thermal decomposition rate at 222° C. and the whiteness are shown in Table 5.

TABLE 6

| Ex. | Component Polyamide | Antioxidant | Coefficient of thermal decomposition rate |
|---|---|---|---|
| 93 | 1D | Tetrakis[methylene-3-(3,5-ditert-butyl-4-hydroxyphenyl) propionate]-methane. | 0.009 |
| 94 | 2B | ____do____ | 0.011 |
| 95 | 2Q | ____do____ | 0.010 |
| 96 | 1D | 1,3,5-trimethyl-2,4,6-tris(3,5-di-tert-butyl-4-hydroxybenzyl) benzene. | 0.010 |
| 97 | 2Q | ____do____ | 0.010 |
| 98 | 1D | 1,1,3-tris(2-methyl-4-hydroxy-5-tert-butylphenyl-butane. | 0.009 |
| 99 | 2L | ____do____ | 0.011 |
| 100 | 1D | 2,4-dis(4-hydroxy-3,5-di-tert-butylphenoxy)-6-(n-octylthio)-1,3,5-triazine. | 0.011 |
| 101 | 2Q | ____do____ | 0.010 |
| 102 | 1D | N,N'-di-β-naphthyl-p-phenylendiamine. | 0.011 |
| 103 | 2Q | ____do____ | 0.011 |

TABLE 5

| Example | | Coefficient of thermal decomposition rate | Hunter's whiteness | Example | Coefficient of thermal decomposition rate | Hunter's whiteness |
|---|---|---|---|---|---|---|
| olyamide: | | | | | | |
| 2A | 57 | 0.049 | 89.2 | 75 | 0.016 | 89.9 |
| 2B | 58 | 0.040 | 89.8 | 76 | 0.013 | 90.5 |
| 2C | 59 | 0.040 | 90.0 | 77 | 0.013 | 90.7 |
| 2D | 60 | 0.039 | 90.2 | 78 | 0.012 | 90.8 |
| 2E | 61 | 0.045 | 89.5 | 79 | 0.017 | 90.3 |
| 2F | 62 | 0.034 | 90.4 | 80 | 0.010 | 91.3 |
| 2G | 63 | 0.049 | 89.0 | 81 | 0.017 | 89.7 |
| 2H | 64 | 0.048 | 88.8 | 82 | 0.017 | 89.4 |
| 2I | 65 | 0.052 | 90.1 | 83 | 0.018 | 91.1 |
| 2J | 66 | 0.043 | 90.9 | 84 | 0.014 | 91.8 |
| 2K | 67 | 0.042 | 91.2 | 85 | 0.014 | 92.1 |
| 2L | 68 | 0.040 | 91.3 | 86 | 0.012 | 92.5 |
| 2M | 69 | 0.047 | 91.7 | 87 | 0.018 | 92.7 |
| 2N | 70 | 0.035 | 92.8 | 88 | 0.011 | 93.6 |
| 2O | 71 | 0.051 | 90.0 | 89 | 0.017 | 90.8 |
| 2P | 72 | 0.050 | 89.8 | 90 | 0.017 | 90.9 |
| 2Q | 73 | 0.032 | 92.6 | 91 | 0.010 | 93.2 |
| 2R | 74 | 0.034 | 89.7 | 92 | 0.010 | 90.4 |
| None | Control 5 | 0.338 | 78.3 | Control 6 | 0.198 | 78.9 |
| Cyanoacetic acid amide | Comparison Example 9 | 0.088 | 70.1 | Comparison Example 13 | 0.063 | 71.8 |
| Malonic acid diamide | Comparison Example 10 | 0.097 | 70.0 | Comparison Example 14 | 0.064 | 71.5 |
| Polycaprolactam | Comparison Example 11 | 0.104 | 75.3 | Comparison Example 15 | 0.082 | 77.6 |
| 6,66,610 polyamide | Comparison Example 12 | 0.087 | 77.5 | Comparison Example 16 | 0.057 | 80.2 |

NOTE:
Control 5 = Simple polyoxymethylene diacetate.
Control 6 = Polyoxymethylene diacetate composition containing 0.2% by weight of 2,2'-methylenebis(4-methyl-6-tert-butylphenol) only.

From Table 5, it is obvious that the polyamides 2A to 2R are more effective for enhancing the heat stability of the polyoxymethylene diacetate than the conventional antioxidant and the conventional polyamide stabilizer. Especially, the compositions of the present invention had a whiteness higher than that of the Control 5 and 6 and Comparison Examples 9 to 16 even after heating them at a high temperature for a long time in air.

EXAMPLES 93 TO 103

Eleven kinds of compositions as shown in Table 6 were prepared from polyoxymethylene diacetate, 1.0% of one of the polyamides 1D, 2B, 2Q and 2L shown in Tables 1 and 3 and 0.2% of a conventional antioxidant selected from tetrakis-[methylene-3-(3,5-di-tert-butyl-4-hydroxyphenyl) propionate]methane,
1,3,5-trimethyl-2,4,6-tris(3,5-di-tert-butyl-4-hydroxy-benzyl)benzene,
1,1,3-tris(2-methyl-4-hydroxy-5-tert-butylphenyl)butane,
2,4-bis(4-hydroxy-3,5-di-tert-butylphenoxy)-6-(n-octyl-thio)-1,3,5-triazine, and
N,N'-di-β-naphthyl-p-phenylenediamine, based on the weight of the polyoxymethylene diacetate.

The compositions had very low coefficients of heat decomposition rate at 222° C., that is, excellent heat stabilities, as shown in Table 6.

EXAMPLE 104

The polyamide 1D as shown in Table 1 was admixed with a copolymer consisting of 97 parts by weight of formaldehyde and 3 parts by weight of ketene and having an intrinsic viscosity of 1.75 in an amount of 1.0% based on the weight of the copolymer together with 0.2% of 2,2'-methylenebis(4-methyl-6-tert-butylphenol) based on the weight of the copolymer. The composition thus prepared was pelletized in the same way as that of Examples 1 to 20 and then, the pellets were subjected to measurements of coefficient of thermal decomposition rate at 222° C. and intrinsic viscosity. From the measurements, it was apparent that the composition had a coefficient of thermal decomposition rate at 222° C. of 0.011 and the same intrinsic viscosity as that of the original copolymer. The pellets had a high whiteness even after the measurement at 222° C.

EXAMPLE 105

A copolymer consisting of 99 parts by weight of formaldehyde and 1 part of ketene and having an intrinsic viscosity of 1.20 was admixed with 1.0% of the polyamide 1D shown in Table 1 and 0.2% of 1,1,3-tris(2-methyl-4-hydroxy-5-tert-butyl-phenyl)butane based on the weight of the copolymer, and the composition was formed into pellets in th same way as Examples 1 to 20. The pellets had a coefficient of thermal decomposition rate at 222° C. of 0.014 and the same intrinsic viscosity as that of the original copolymer.

Further, the pellets had an excellent whiteness even after they were measured at 222° C.

EXAMPLE 106

A copolymer consisting of 99 parts by weight of trioxane and 1 part by weight of ethylene oxide and having an intrinsic viscosity of 1.73 was admixed with 1.0% by weight of the polyamide 1D shown in Table 1 based on the weight of the copolymer and the composition was pelletized in the same way as Examples 1 to 20. The resultant pellets had a coefficient of thermal decomposition rate at 222° C. of 0.018 and the same intrinsic viscosity as that of the copolymer, and had an excellent whiteness even after they were measured at 222° C.

EXAMPLE 107

The same procedure as Example 106 was repeated except that the composition further contained 0.2% of 2,2'-butylidenebis(4-methyl-6-tert-butylphenol). The resultant pellets had a coefficient of thermal decomposition rate at 222° C. of 0.008 and the same intrinsic viscosity as that of the copolymer, and had an excellent whiteness even after the measurement of the coefficient of thermal decomposition rate at 222° C.

EXAMPLE 108

A copolymer consisting of 98 parts by weight of formaldehyde and 2 parts by weight of 1,3-dioxolan and having an intrinsic viscosity of 1.30 was admixed with 1.0% of the polyamide 1D as shown in Table 1, and the composition was pelletized in the same way as Examples 1 to 20. The resultant pellets had a coefficient of thermal decomposition rate at 222° C. of 0.018 and the same intrinsic viscosity as that of the copolymer, and had a high whiteness even after the measurement of the coefficient of thermal decomposition rate at 222° C.

EXAMPLE 109

The procedure of Example 108 was repeated except that the composition further contained 0.2% of 2,2'-methylenebis(4-methyl-6-tert-butylphenol). The resultant composition pellets had a coefficient of thermal decomposition rate at 222° C. of 0.009 and the same intrinsic viscosity as that of the original copolymer, and had a high whiteness even after the pellets were subjected to the measurement at 222° C.

EXAMPLE 110

A copolymer which consisted of 97 parts by weight of formaldehyde and 3 parts by weight of 1,3,6-trioxocane and had an intrinsic viscosity of 1.70 was admixed with 1.0% of the polyamide 1D as shown in Table 1 and 0.2% of 2,2'-butylidenebis(4-methyl-6-tert-butylphenol) based on the weight of the copolymer by the same method as Examples 1 to 20. The resultant composition pellets hat a coefficient of heated composition rate at 22° C. of 0.010 and the same intrinsic viscosity as the simple copolymer and had a high whiteness even after measurement at 222° C.

What we claim is:
1. A polyacetal composition consisting essentially of:
   (a) a polyacetal; and,
   (b) at least one polyamide having a weight percentage between 0.01% to 10.0% of said polyacetal, said polyamide being a polycondensation product of,
      (A) at least one component having the formula $H_2NRNH_2$, where R is a group selected from the class consisting of aliphatic, alicyclic, and aromatic hydrocarbon groups having 2 to 20 carbon atoms and groups consisting of two or more of said hydrocarbon groups combined by an oxygen or sulphur atom,
      (B) at least one component of the formula $XOCCH_2COX$, where X is a member selected from the class consisting of hydroxyl group, halogen atoms and lower alkoxyl groups having 1 to 6 carbon atoms, and
      (C) at least one component having the formula $YCH_2COX$, where X is a member selected from the class consisting of hydroxyl group, halogen atoms and lower alkoxyl groups having 1 to 6 atoms, and Y is a member selected from the class consisting of cyano and carbamoyl groups, in an amount of each of said component (A) and (B) of 1 to 30 moles with respect to 1 mole of said component (C), said polyamide having a molecular weight of 450 to 5,000, said polyacetal composition being devoid of stabilizers.

2. A polyacetal composition as set forth in claim 1, wherein said component (A) in said polyamide is selected from the class consisting of ethylene diamine, 1,2-diaminopropane, 1,3-diaminopropane, 1,2-diaminobutane, 1,4-diaminobutane, 2,3-diaminobutane, 1,2-diamino-2-methylpropane, 1,5-diaminopentane, 1,6-diaminohexane, 1,7-diaminoheptane, 1,8 - diaminooctance, 1,10 - diaminodecane, 1,12-diamonododecane, 1,18-diaminooctadecane 1,20 - diaminoeicosane, bis($\beta$-aminoethyl)ether, bis($\gamma$-aminopropyl)ether, 1,2-bis($\gamma$-aminopropoxy)ethane, p-phenylenediamine, m-phenylenediamine, p-aminobenzylamine, m-aminobenzylamine, p-xylylenediamine, m-xylylenediamine, 1,4 - diaminocyclohexane, 1,3-diaminocyclohexane, 1,4-bis(aminomethyl)cyclohexane, 1,3-bis(aminomethyl)cyclohexane, 4,4'-diaminobiphenyl, 4,4'-diaminodiphenylmethane, 4,4'-diaminodiphenylether, and 4,4'-diaminodiphenylthioether.

3. A polyacetal composition as set forth in claim 1, wherein said component (B) of said polyamide is selected from the class consisting of malonic acid, diethyl malonate, dimethyl malonate and malonic acid dichloride.

4. A polyacetal composition as set forth in claim 1, wherein said component (C) of said polyamide is selected from the class consisting of cyanoacetic acid, methyl cyanoacetate, ethyl cyanoacetate, cyanoacetic acid chloride, malonic acid monoamide, monomethylester of malonic acid monoamide and malonic acid monoamide monochloride.

5. A polyacetal composition as set forth in claim 1, wherein said polyamide has a melting point of 100 to 230° C.

6. A polyacetal composition as set forth in claim 1, wherein said polyacetal is selected from the class consisting of homopolymers of formaldehyde, trioxane and tetraoxane and copolymers of at least one member of the above-mentioned compounds and at least one comonomer capable of copolymerizing with the above-mentioned compounds.

7. A polyacetal composition as set forth in claim 6, wherein said homopolymers or copolymers have nonactive terminal groups.

References Cited
UNITED STATES PATENTS

| | | | |
|---|---|---|---|
| 3,235,624 | 2/1966 | Green | 260—857 |
| 2,993,025 | 7/1961 | Alsup | 260—857 |
| 3,204,012 | 8/1965 | Eguchi | 260—857 |
| 3,459,709 | 8/1969 | Ackermann | 260—857 |
| 3,555,514 | 11/1967 | Walle | 260—857 |

PAUL LIEBERMAN, Primary Examiner

U.S. Cl. X.R.

260—45.8 N, 45.95, 67 FP, 78 R